United States Patent [19]

Meyer

[11] Patent Number: 5,180,329

[45] Date of Patent: Jan. 19, 1993

[54] AUTOMATIC FOOT AND HOOF SHEAR

[75] Inventor: Philip G. Meyer, Plainview, Tex.

[73] Assignee: Jarvis Products Corporation, Middletown, Conn.

[21] Appl. No.: 759,456

[22] Filed: Sep. 13, 1991

[51] Int. Cl.⁵ .............................................. A22C 17/02
[52] U.S. Cl. .................................... 452/166; 452/154; 30/241; 83/365
[58] Field of Search ............... 452/166, 167, 154; 30/209, 241; 83/364, 365, 370, 372, 697

[56] References Cited

U.S. PATENT DOCUMENTS

| | | | |
|---|---|---|---|
| 1,091,607 | 3/1914 | Weaver | 30/258 |
| 1,597,859 | 7/1923 | Jardine | 30/258 |
| 2,446,011 | 8/1945 | Johnson et al. | 121/3 |
| 2,532,359 | 9/1945 | Drmic | 30/258 |
| 2,606,340 | 8/1952 | Black | 452/166 |
| 2,658,235 | 11/1953 | Ograbisz | 452/166 |
| 2,931,100 | 2/1958 | Wertepny | 30/258 |
| 3,159,913 | 7/1962 | Winton | 30/252 |
| 3,165,780 | 9/1962 | Kellersman et al. | 452/166 |
| 3,409,983 | 10/1965 | Jamison | 30/228 |
| 3,488,797 | 12/1967 | Kirks | 452/166 |
| 3,693,254 | 9/1972 | Salonen | 30/228 |
| 3,882,570 | 5/1975 | Zwiep et al. | 452/154 |
| 3,893,237 | 7/1975 | Jahnke | 30/228 |
| 4,026,028 | 5/1977 | Green | 30/241 |
| 4,627,167 | 12/1986 | Karubian et al. | 30/241 |
| 4,737,904 | 4/1988 | Ominato | 83/365 |

Primary Examiner—Willis Little
Attorney, Agent, or Firm—DeLio & Associates

[57] ABSTRACT

A device for automatically shearing hooves from a carcass continuously moving along an overhead rail including a frame horizontally slidable on a base and a shearing assembly vertically slidable on the frame. Drivers are provided to move the shearing assembly to the proper position relative to the hooves on an approaching carcass and to move a blade on the shearing assembly from the open to the closed position. The positioning drivers are controlled by sensors that detect the horizontal and vertical location of the approaching hooves. A pass-through shearing region defined by the shearing assembly preferably accommodates two hooves simultaneously and guides are provided to sweep the shearing region and direct the hooves into the path of the blade. The blade driver is actuated responsive to a signal from a carcass position sensor indicating the presence of a hoof in the shearing region. Multiple safety interlocks are provided.

23 Claims, 5 Drawing Sheets

AUTOMATIC FOOT AND HOOF SHEAR

BACKGROUND OF THE INVENTION

1. Field of the Invention

This invention relates to a device for shearing the hooves from a meat carcass, and more particularly to an automatic shear which positions a shearing blade relative to the hooves on a carcass moving along on an overhead carcass rail and then actuates the shearing mechanism, all without operator intervention.

2. Description of Related Act

In a meat packing facility, animal carcasses are suspended from their hind legs on hooks carried in trolleys which roll along an overhead carcass rail. The trolleys are continuously driven along the carcass rail to move the carcasses through the facility from one processing station to another. One step in the processing requires the removal of the front hooves from the suspended carcass.

At the present time, hoof removal is accomplished with a hock cutter such as the Model 30 CL or Model 500 HC hock cutters sold by Jarvis Products Corporation of Middletown, Conn. Although such devices are provided with hydraulic power to operate the shears and counterbalancing mechanisms to reduce the effort required to manipulate them into position, nonetheless, they are essentially hand operated tools which must be properly positioned and triggered by a trained operator.

By the nature of such tools, they present an amputation hazard, particularly when the operator is tired. An automatic tool significantly reduces this risk. Moreover, with present handheld units it is difficult to obtain consistent cuts when the line moves rapidly. This difficulty is increased with a handheld tool over the automatic tool disclosed herein, because in the handheld tool, each leg must be cut individually, whereas in an automatic cutter it is possible to cut both hooves simultaneously.

Earlier attempts to incorporate the design of conventional handheld hock cutters into an automatic machine were not successful, primarily due to the difficulty in properly positioning the cutters relative to the hooves. The hooves had to be guided into the small jaw openings in the prior art handheld hock cutters, which proved to be very difficult and expensive to accomplish reliably.

A further reason for the lack of success was that occasionally the hock cutter would fail to completely sever the hoof from the carcass, due to the presence of a tendon or a nerve fiber which was not severed when the blades become dull. With a hand actuated cutter, the tool can be actuated a second time to complete the cut, however, where the cutter is automatic, when the cut failed, the force exerted by the carcass as it was pulled along by the overhead carcass rail was sufficient to damage or even completely dislodge the cutting machine.

A principal object of the invention is to provide a hoof shearing machine that is automated.

Another object of the invention is to provide a design in which both hooves are severed simultaneously.

Yet another object of the present invention is to provide a hoof shearing machine with a pass-through cutting region which is open at both ends to permit the carcass to move through the machine, even if the cut fails, without disrupting the cutting operation for the next carcass.

A further object of the invention is to provide a machine which seldom fails to fully remove the hooves because it first shears the hooves, and then exerts a pulling force to completely separate the hooves from the carcass.

Another object of the invention is to provide a design with safety interlocks such that the machine will only operate when a carcass is actually in position.

SUMMARY OF THE INVENTION

In keeping with these objects and other objects of the invention which will become apparent hereinafter, the present invention comprises an automatic hoof shearing device mounted on a base positioned near a carcass rail having a carcass moving along the rail suspended from trolleys. A frame is mounted on the base and a shearing assembly is mounted on the frame. The shearing assembly includes at least one shearing blade, moveable in a shearing plane between an open and a closed shearing position. A carcass position sensor produces a signal indicating the presence of a carcass with a hoof in the shearing region, and a shearing driver operates in response to the signal from the carcass position sensor to move the shearing blade from the open to the closed position to shear the hoof from the carcass.

In the preferred design, the shearing assembly is movably mounted for vertical and horizontal motion relative to the base. A hoof position sensing assembly produces a signal indicating the position of the hoof on a carcass approaching the shearing region. A control system receives the signal from the hoof position sensing assembly and controls horizontal and vertical drivers which move the shearing assembly and shearing plane to a desired vertical and horizontal location relative to the approaching hoof on the carcass. In one embodiment, the frame is slidably mounted on the base for horizontal motion relative thereto and the shearing assembly is slidably mounted on the frame for vertical motion relative thereto.

The hoof position sensing assembly preferably comprises a vertical position sensor and a horizontal position sensor, producing vertical and horizontal position signals respectively. In the most highly preferred embodiment, the vertical and horizontal position sensors comprise a sensing wand and a sensing plate, which are contacted by the approaching carcass. The control system then drives the carriage vertically and horizontally until the sensing wand and plate no longer contact the carcass, at which point the shearing plane has been positioned in the desired location relative to the carcass.

As an additional safety feature, the hoof shearing device is provided with a blade cover moveable between an open and a closed position which prevents removal of at least one shearing blade when the cover is in the closed position, and disables the shearing driver when the blade cover is in the open position.

The shearing region is wide enough to accommodate two hooves simultaneously, and guides are preferably provided which sweep the shearing region on either side of two blade inserts to bring the hooves into position in front of the closing blades.

DETAILED DESCRIPTION OF THE PREFERRED EMBODIMENT

Figure 1:
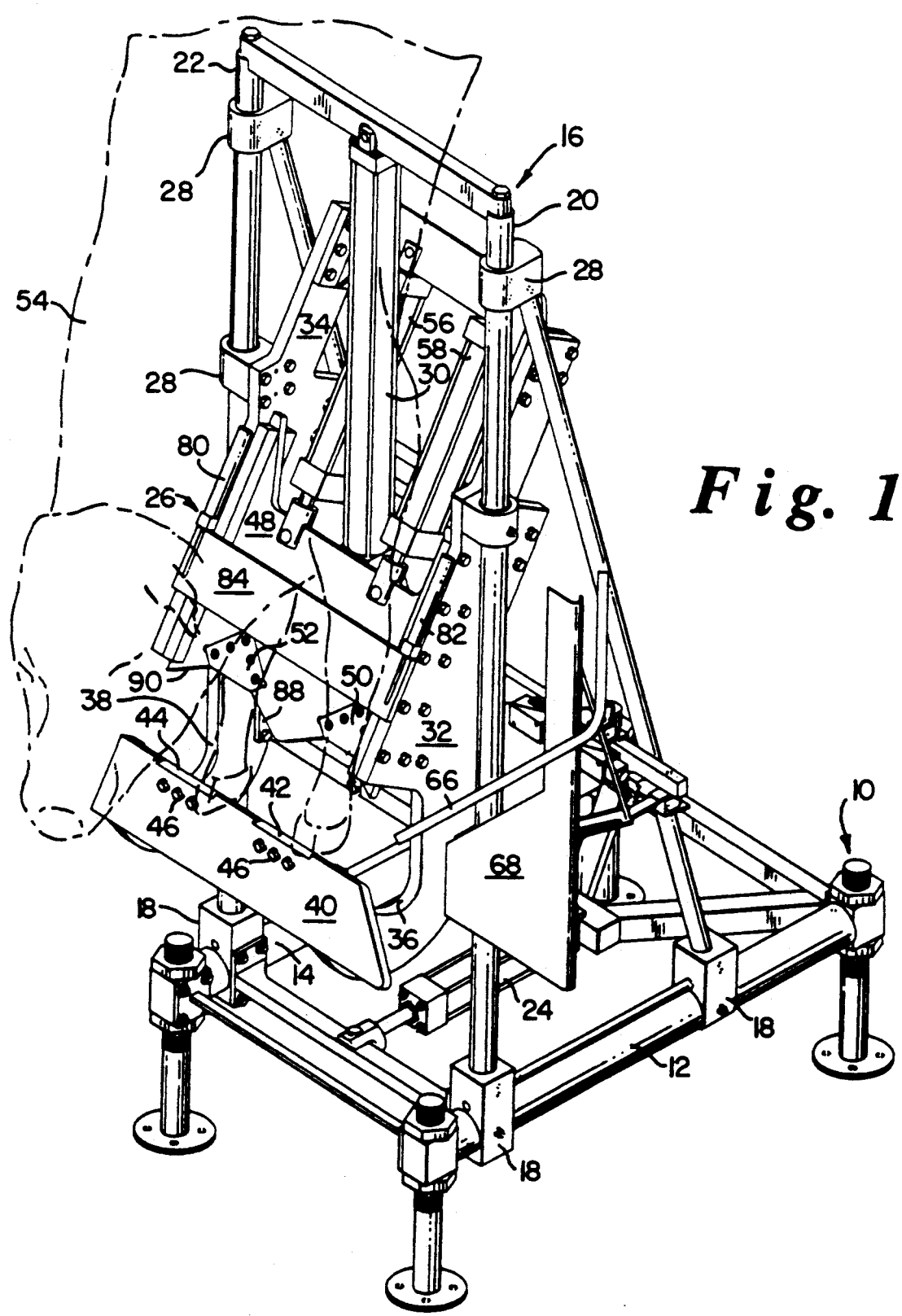
FIG. 1 is a perspective view of the automatic hoof shearing device according to the present invention.

Referring to FIG. 1, the automatic hoof shear comprises a base 10 having a pair of horizontal spaced apart slide rails 12, 14 forming a horizontal slide track. A frame, generally indicated with reference numeral 16, slides horizontally along the base slide rails 12, 14 on four slide blocks 18.

The frame includes a second set of slide rails 20, 22 which are oriented vertically. The entire frame assembly 16, including the frame slide rails 20, 22, is moved horizontally under the power of a frame driver 24, connected between the front of the frame 16 and the back of the base 10. The frame driver 24 comprises a conventional linear hydraulic cylinder driver mechanism, and hydraulic fluid may be directed to either side of the piston in the frame driver 24 to drive the frame either forward or back along the base slide rails 12, 14.

A shearing assembly, generally indicated by reference numeral 26, is carried by the frame 16 on four slide blocks 28 which slide vertically on the frame slide rails 20, 22.

The shearing assembly is moved vertically along the frame slide rails by the shearing assembly driver 30 which also comprises a linear hydraulic cylinder driver. Other types of linear driver mechanisms, such as pneumatic drivers and mechanical screw mechanisms or geared drivers might also be used. The shearing assembly driver 30 is connected between the upper crossbar on the frame 16 and the shearing assembly. Like the frame driver, the shearing assembly driver can be driven in either of two directions depending on which side of the piston the hydraulic fluid is directed.

For clarity in the drawings, the hydraulic hoses, valves and control system which control the valves and drivers 24, 30 are not shown. The interconnection of these components to their respective drivers is conventional.

As will be understood from the description above, the orthogonal relationship between the two sets of slide rails, and the bidirectional drive of the hydraulic cylinder drivers 24, 30 allows the shearing assembly to be positioned at any desired vertical and horizontal location within the limits of the slide rails.

The shearing assembly comprises a pair of opposed support plates 32, 34 (shown in greater detail in FIG. 3), each of which includes a cutout 36, 38. A lower blade support 40 is mounted between the opposed support plates 32, 34 on one side of the cutouts 36, 38 and an upper sliding blade support 48 is slidably held in guide rails between the support plates 32, 34 on the other side of the cutouts.

Two replaceable fixed blade inserts 42, 44, which form the lower shearing blade, are held in place on the lower blade support by bolts 46. The upper sliding blade support 48 includes a pair of replaceable triangular blade inserts 50, 52 held in triangular recessed blade cavities by 5 recessed screws. The upper blade inserts 50, 52 are approximately one-half the thickness of the sliding blade support plate 48 and fit into matching triangular blade insert recesses which have a depth equal to the thickness of the inserts. This construction securely holds the blade inserts against the force exerted during the shearing operation.

The upper blades 50, 52 are driven from an open position (as seen in FIG. 1) to the closed position by a pair of hydraulic cylinder shearing blade drivers 56, 58, in order to shear the hoofs from the carcass 54. The shearing blade drivers 56, 58 are mounted between an upper crossbar on the shearing assembly and the sliding blade support 48 for the upper blades.

The sliding motion of the upper blades 50, 52, and blade support 48, define a shearing plane which is oriented at an angle of approximately 30 to the vertical. This angle provides the preferred angle for shearing the hooves from the carcass 54 which is continuously moving along the overhead carcass rail 60.

The region between the upper and lower blade supports between the two support plates 32, 34 and the cutouts 36, 38 defines a shearing region within which hooves will be sheared when the shearing drivers are actuated. The shearing region in this design is referred to as a "pass-through" shearing region, because the cutouts 36, 38 leave the shearing region open at each end and permit an unobstructed passage of the hooves into and out of the shearing region if the shearing operation is only partially complete or the machine is disabled.

Figure 2:
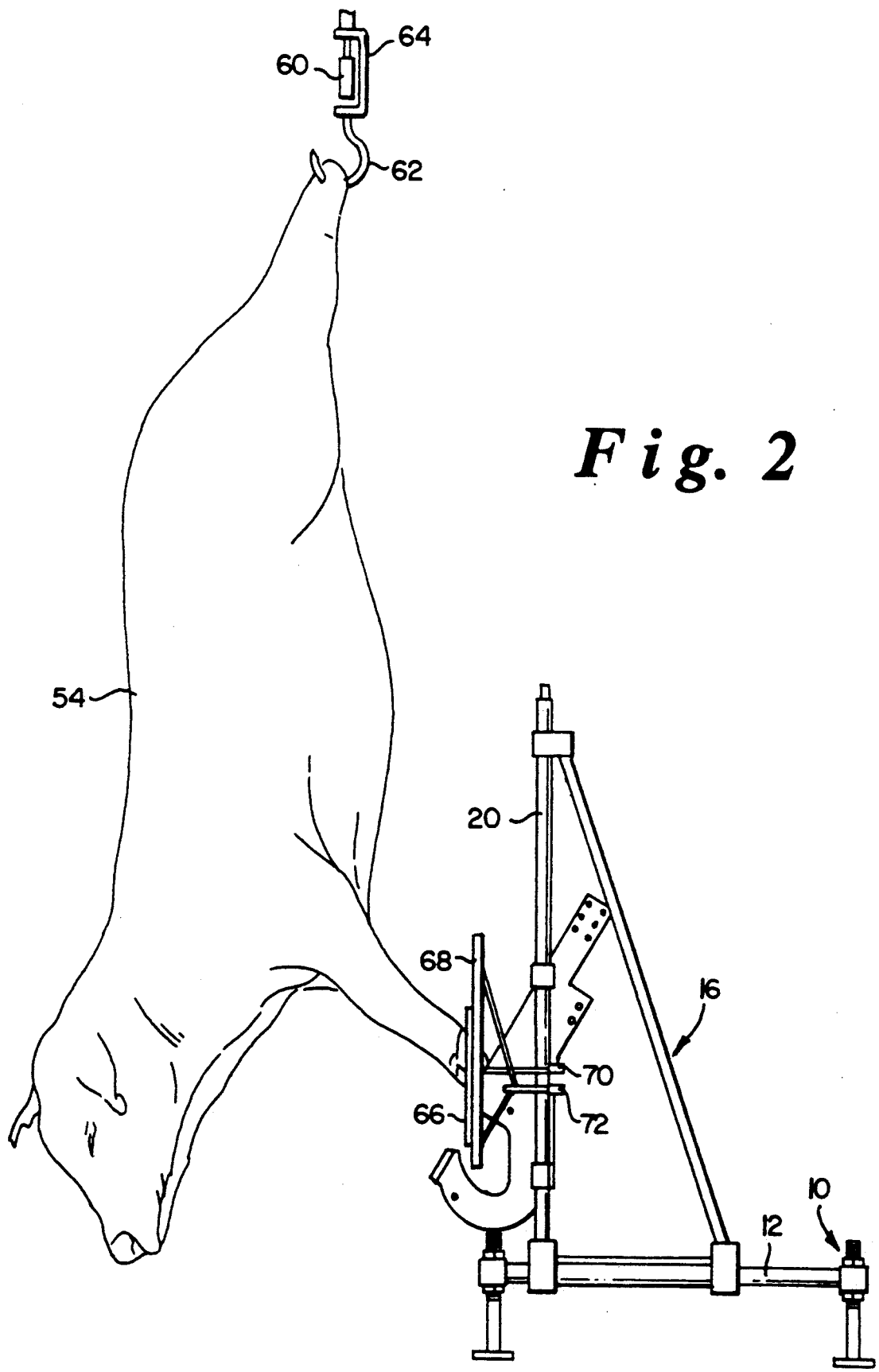
FIG. 2 is a side elevational view showing a carcass on a carcass rail moving into position.

FIG. 2 shows the hoof shearing device in the proper position relative to an overhead carcass rail 60. The base 10 of the machine is positioned to one side of the rail facing the hanging hooves of the moving carcass 54. The hind legs of the carcass 54 are carried on hooks 62 which ride on trolleys 64 along the carcass rail 60. The trolleys are continuously driven along the carcass rail during the entire hoof shearing operation by a chain or other conventional drive mechanism.

FIG. 2 illustrates the hoof shearing device with the shearing assembly in the initial starting position—with the frame 16 in the fully forward horizontal position and the shearing assembly 26 in the fully down vertical position. Each carcass 54 in a series of carcasses approaches the shearing device when it is in this initial starting position, and after each shearing cut is made it is returned to this position. The carcasses are moving along the carcass rail into the plane of FIG. 2, and from the lower right to the upper left in FIG. 1.

As the carcasses approach the shearing device the leading front hoof makes contact with the hoof position sensing assembly comprising sensing wand 66, which senses the vertical position of the leading hoof, and sensing plate 68, which senses the horizontal position of the leading hoof. The sensing wand 66 and sensing plate 68, are mounted on the shearing assembly and move horizontally and vertically with it as the frame driver and shearing assembly driver move the location of the shearing plane relative to the moving carcass.

The sensing wand 66 includes a short vertical portion and a longer downwardly sloping portion, Referring to FIG. 2 it can be seen that the entire wand lies in a plane that is perpendicular to the plane of that Figure, i.e., parallel to the plane defined by the vertical slide rails 20, 22.

Figure 4:
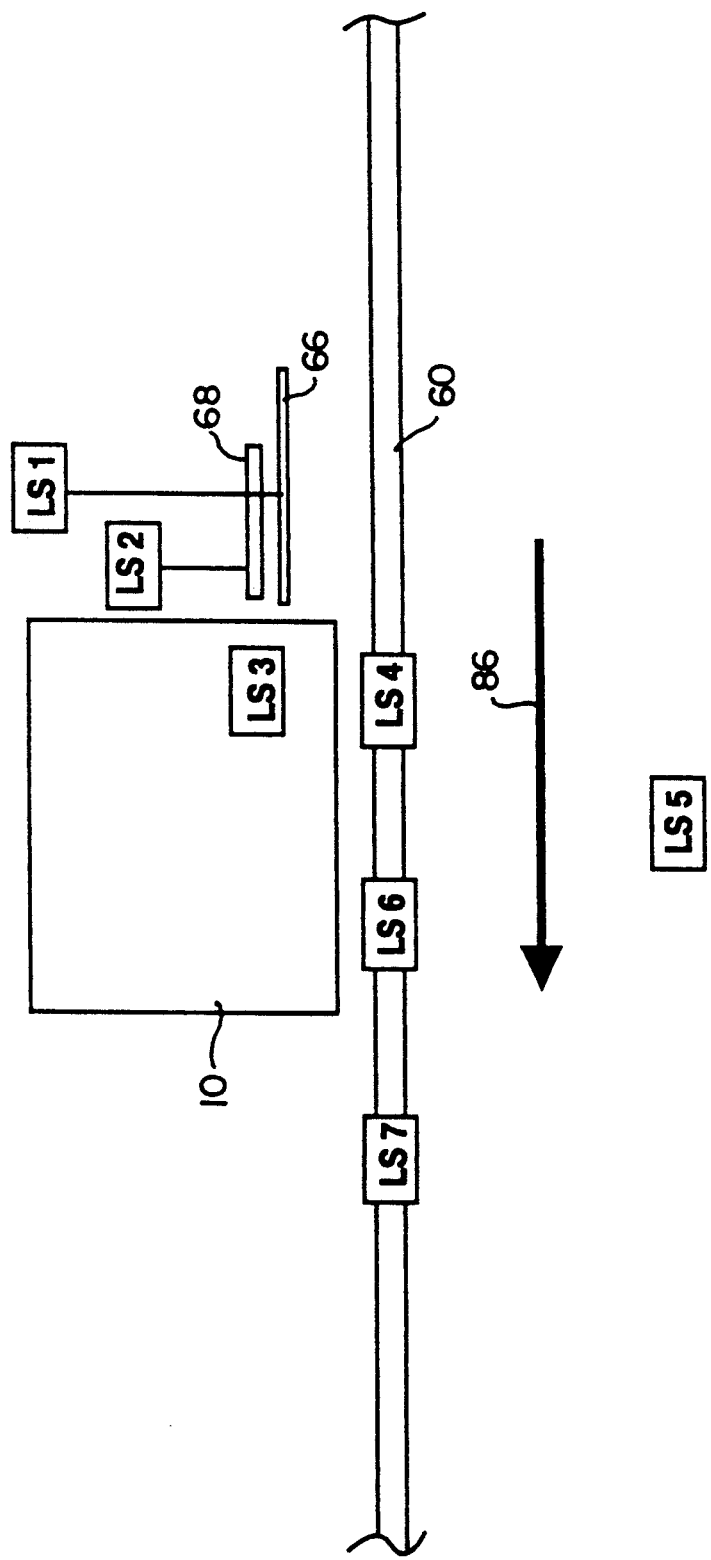
FIG. 4 is a generalized block diagram in plan view showing the relative positions of limit switch sensors, a carcass rail and the base of the hoof shearing device in a preferred mounting arrangement of the invention.

As the leading hoof on the carcass contacts sensing wand 66, usually on the downwardly sloping portion, the wand swings back in a short horizontal arc, rotating about pivot axis 70 and actuating sensing switch LS-1, seen diagramatically in FIG. 4. Sensor LS-1 in turn activates the shearing assembly driver 30 to slide the shearing assembly 26 vertically up along the frame slide rails 20, 22.

The shearing assembly driver is smoothly and continuously driven up, carrying the sensing wand and sensing plate, until the sensing wand 66 reaches a position just over the top of the leading hoof on the carcass 54. At this point the sensing wand 66, which is forwardly spring biased, passes over the top of the leading hoof swinging back to its original position and switching LS-1 back to its initial state shutting off the drive to the shearing assembly driver 30. Thus, the sensing wand and switch LS-1 act to control driver 30 and move the shearing plane vertically to the proper position relative to the approaching lead hoof.

The sensing plate 68 operates in a similar manner to sense the horizontal location of the approaching hoof. As the hoof approaches, the sensing plate is in the fully forward position, i.e., as close to the line of motion of the carcass as the travel on the horizontal base rails will allow. The hoof contacts sensing plate 68 and the continued motion of the carcass along the carcass rail causes the sensing plate to rotate back about pivot 72 actuating switch LS-2 (see FIG. 4). The signal from LS-2, in turn, operates the frame driver 24 to pull the frame back and away from the carcass until the sensing plate 68 no longer contacts the leading hoof. As soon as contact with the hoof is lost, the sensing plate, which is also spring biased forward, swings back, shutting off LS-2, indicating that the shearing plane has been properly positioned horizontally. Upon the loss of the signal from LS-2, the frame driver 24 shuts off.

In the preferred embodiment, the hydraulic frame driver and shearing assembly driver are controlled by conventional electrically operated hydraulic valves. LS-1 and LS-2 are electrical switches and the signals they generate control the drivers through a logic and control system which allows various safety interlocks to be designed into the equipment.

In the preferred design, the sensing wand 66 is bent at a downward angle to the path of the approaching carcass. If the speed of the drivers is too great, the frame will be rapidly moved away from the carcass, causing the sensing wand 66 to briefly lose contact with the hoof and/or leg until the carcass moves back into contact with the sensing wand by its continued motion along the carcass rail. This cycle would repeat with intermittent motion until the proper position has been reached.

To prevent this intermittent movement, the rate of motion of the drivers can be adjusted proportional to the speed of the overhead carcass rail such that the sensing wand 66 only loses contact with the approaching hoofs when the shearing plane has actually reached the proper vertical position. This proportional adjustment is made by adjusting the hydraulic flow to the drivers.

The speed of the positioning drivers 24, 30 is sufficiently great that the shearing assembly has been properly positioned before the first hoof on the carcass has entered the first cutout 36. In the preferred design, the vertical driver 30 moves the shearing assembly at a rate of about 18 inches per second (45 cm/sec) and the horizontal frame driver 24 operates at about 6 inches per second (15 cm/sec), however these may be adjusted according to the speed of the carcass rail.

Once both hooves are fully within the shearing region the two shearing drivers 56, 58 are actuated and the sliding blade support plate 48 is driven down to shear the hooves from the carcass. To ensure that the hooves are properly aligned with the blades as they close, the upper blade support 48 is formed along its lower edge into two pairs of angled guide surfaces, one surface on either side of a corresponding blade insert. Guide surfaces 88, 90 sweep the shearing region on either side of blade insert 52 and a second pair sweep the shearing region on either side of blade insert 50. This sweeping action guides and separates the two hooves and moves them into position in front of the closing blades.

Figure 3:
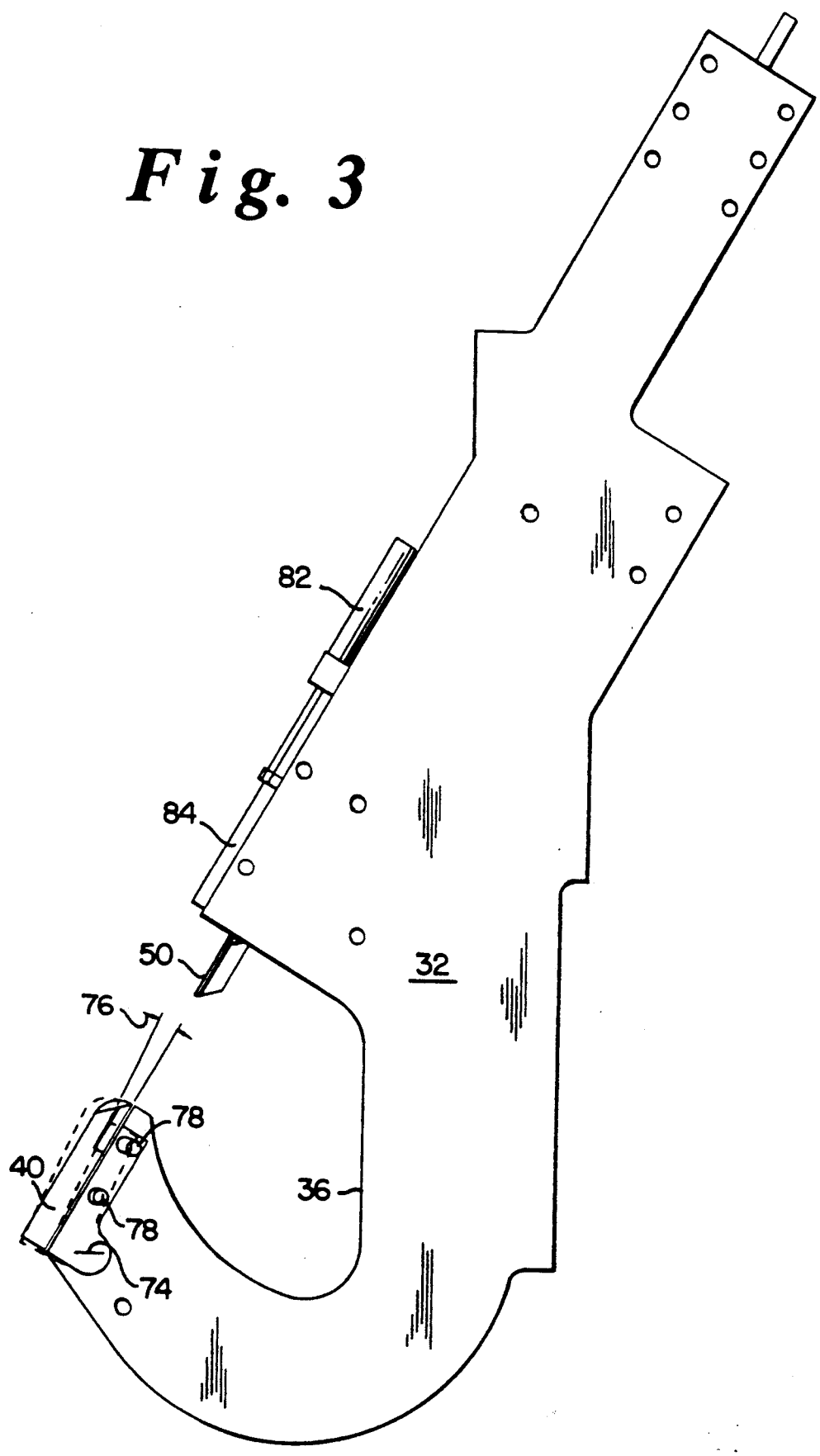
FIG. 3 is a detail side view of a portion of the invention showing the adjustable blade system.

Referring to FIG. 3 it can be seen that the lower blade support 40 rotates around pivot point 74 about a small angle indicated with reference number 76, to adjust the clearance distance between the upper and lower blades. The upper shearing blade inserts pass just behind, but closely adjacent to, the cutting edges on the lower shearing blade inserts 42, 44. The clearance distance is adjusted by rotating the lower blade support 40 until the clearance distance is correct and then locking the rotated blade support with locking bolts 78.

Referring back to FIG. 1, a blade cover 84 can be seen located just above the upper blade inserts 50, 52. The blade cover 84 can be moved down by two pneumatic blade cover drivers 80, 82 until it covers the recessed bolts holding the blade inserts 50, 52.

The control system described below implements an interlock between the blade cover and the shearing drivers 56, 58, to disable operation of the shearing drivers as long as the blade cover is in the retracted position shown in FIG. 1. Thus, it is impossible to change the blades 50, 52 when the blade drivers are enabled and the possibility of injury during maintenance of the device is significantly reduced.

Sequence of Operation

FIG. 4 shows the relative positions of seven limit switches LS-1 through LS-7 which in the preferred embodiment sense the position of the carcass as it moves past the shearing device in the hoof shearing operation. In FIG. 4, the direction of motion of the carcass is shown by arrow 86, the carcass rail is indicated by 60, and the position of the rectangular base 10 of the machine is generally indicated relative to the sensors and the rail.

Figure 5:
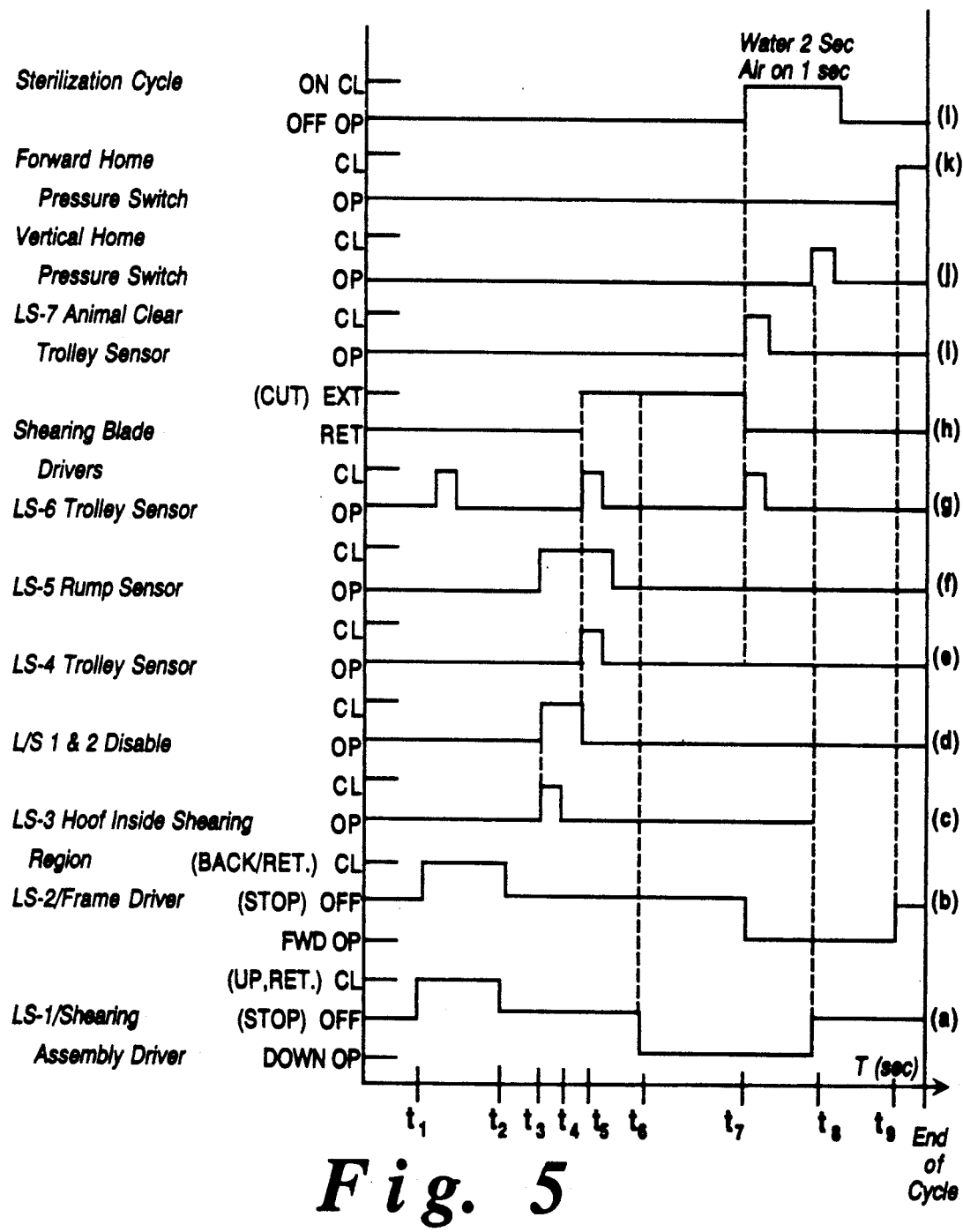
FIGS. 5(a)-5(l) show timing diagrams for operation of the drivers and sensors in a typical operation cycle.

FIG. 5 shows timing diagrams for the sensors and drivers, and should also be referred to in this description of the control system for the device.

As the carcass 54 moves along the carcass rail 60, it initially contacts the sensing wand 66 activating limit switch LS-1 as described above. This is also shown in FIG. 5($a$) (which shows the shearing assembly driver control signals) at time $t_1$. LS-1 is connected to the shearing assembly driver 30 through the control system logic which immediately begins to raise the shearing assembly 26. At approximately the same time ($t_1$) as indicated in FIG. 5($b$), the leading hoof also contacts the sensing plate 68 which rotates about its vertical pivot, actuating limit switch LS-2.

LS-2 is connected to the frame driver 24 through the control system which retracts the frame away from the approaching carcass until the proper horizontal position is reached. Although the vertical and horizontal drivers move independently, both typically operate from about time $t_1$ to about time $t_2$, however, the exact moment of starting and stopping of the two drivers 24, 30 is dependent upon the initial vertical and horizontal position of the approaching lead hoof.

At about time $t_2$, the shearing plane has been properly positioned vertically and horizontally relative to the approaching lead hoof. At about time $t_3$, the continued motion of the carcass brings the lead hoof into the shearing region. A second sensing wand is located inside the shearing region and is connected to limit switch LS-3. LS-3 acts as a sensor to signal the presence of the first hoof inside the shearing region, and its relative position is shown diagramatically in FIG. 4. To decrease the complexity of FIG. 1, it is not illustrated there, however, it operates in substantially the same manner as LS-1.

The function of LS-3 is to disable the drivers for the shearing assembly and frame so as to ignore LS-1 and LS-2 if they signal contact with the second hoof. The second hoof may be in a slightly different position from the first hoof, and without this disabling input from LS-3, the machine would readjust the position of the shearing plane to the location of the second hoof. This reduces wear of the machine by only positioning on the first hoof.

The output of switch LS-3 is shown in FIG. 5(c). This output acts as a trigger to set a disabling function in the logic controller which disables all inputs from LS-1 and LS-2 until after the shearing cut is made at time $t_4$. The disabling function is shown in FIG. 5(d). It is set at time $t_3$ by LS-3 and it is reset at time $t_4$ by the cutting stroke.

At approximately time $t_3$, as indicated in FIG. 5(f), the LS-5 rump sensor is also activated. This is also a sensing wand which is positioned at an appropriate location along the path of the carcass to contact it as the carcass moves through the shearing station. Its function is to verify that a carcass is actually in position on the carcass rail at the point when the shearing blade drivers are tripped. In the absence of a signal from this sensor, the shearing blades cannot be activated and the shearing cannot be completed. This is a safety feature to further minimize the risk of injury to workers in the vicinity of the machine.

The sensing wand attached to limit switch LS-5 is sufficiently long to contact the carcass from time $t_3$ until approximately time $t_5$ when the carcass has moved past the sensor. During this interval the shearing operation occurs in the manner described below.

LS-4 and LS-6 are sensors on the carcass rail which act as carcass position sensors to verify that the carcass is actually in the correct position relative to the shearing assembly with the hooves in the shearing region. At time $t_4$, exactly when the last of three limit switches, LS-4, LS-5 and LS-6, closes, the shearing blade drivers 56 and 58 are triggered as shown in FIG. 5(h) to complete the cut. This cut signal also resets the LS-1 and LS-2 disable function in the logic controller as shown in FIG. 5(d).

It should be noted that the entire shearing operation is conducted while the carcass is continuously moving along the carcass rail.

At time $t_4$ when the cut occurs, a fixed internal timer in the logic controller is also started which elapses at time $t_6$. At this time, as seen in FIG. 5(a) (which shows the input to the vertical shearing assembly driver), the logic controller drives the shearing assembly driver 30 down to the bottom of the vertical rails. Referring to FIG. 5(h) it can be seen that at time $t_6$ when this motion occurs, the shearing blade drivers are still closed. By driving the shearing assembly vertically to its lower limits, in the event that the hooves were incompletely sheared, the pulling force will complete the shearing operation and the sheared hoof will drop down into a removal system (not shown).

Limit switch LS-7 is mounted on the trolley rail to sense when the carcass has moved out of the shearing region. Referring to FIG. 4 and FIGS. 5(i) and 5(g), at time $t_7$ the leading leg trolley contacts and closes limit switch LS-7 and the trailing leg trolley contacts and closes limit switch LS-6. The simultaneous closure of these two limit switches initiates the sterilization cycle in FIG. 5(l) in which heated sterilization water is sprayed onto the blades for a period of two seconds, followed by a blast of air to clean and dry the blades for a period of an additional second.

At time $t_8$ as seen in FIG. 5(a), the shearing assembly driver has reached the fully down starting position and contacts a vertical home pressure switch (not shown) indicating that the shearing assembly has reached the home position. The output from the vertical home switch is seen in FIG. 5(j).

At time $t_7$, when the sterilization cycle begins, as seen in FIG. 5(b), the frame driver also begins to move forward under the direction of the logic controller. At driver has reached the fully forward position and contacts the forward home pressure switch (not shown), signifying that the frame is fully forward in the horizontal starting position.

The entire cycle described above then repeats as the next carcass arrives at the station.

All of the timing and logic functions required to accomplish the control system functions, are preferably provided by a conventional programmable logic controller, however, the functions could also be implemented by hard-wiring relays, switches and timers, or by programming a computer controller.

Having thus described the invention, what is claimed is:

1. An automatic hoof shearing device comprising:
   a base adapted for mounting near a carcass rail;
   a frame movably mounted on the base;
   a frame driver connected between the frame and the base for moving the frame relative to the base;
   a shearing assembly movably mounted on the frame, the shearing assembly including at least one shearing blade movable in a shearing plane between an open and a closed shearing position, the shearing assembly defining a shearing region;
   a shearing assembly driver connected between the shearing assembly and the frame for moving the shearing assembly relative to the frame;
   a carcass position sensor producing a signal indicating the presence of a carcass with a hoof in the shearing region;
   a hoof position sensing assembly producing a signal indicating the position of a hoof on a carcass approaching the shearing region;
   a control system connected to receive the signal from the hoof position sensing assembly and connected to control the frame driver and shearing assembly driver to move the frame and shearing assembly and position the cutting plane to a desired location relative to the hoof on the carcass; and
   a shearing blade driver responsively connected to the carcass position sensor for moving the shearing assembly from the open to the closed position to shear the hoof from the carcass.

2. An automatic hoof shearing device according to claim 1 wherein the frame is slidably mounted on the base for horizontal motion relative thereto and the shearing assembly is slidably mounted on the frame for vertical motion relative thereto.

3. An automatic hoof shearing device according to claim 2 wherein the hoof position sensing assembly comprises a vertical position sensor and a horizontal position sensor.

4. An automatic hoof shearing device according to claim wherein:
the vertical position sensor includes a sensing wand mounted to move with the shearing assembly, the sensing wand producing a vertical position signal when in contact with the carcass; and
the control system is adapted to operate the shearing assembly driver and drive the shearing assembly vertically, responsive to the presence of the vertical position signal, until the sensing wand no longer contacts the carcass, to position the cutting plane to the desired vertical location relative to the carcass.

5. An automatic hoof shearing device according to claim 4 wherein:
the horizontal position sensor includes a sensing plate mounted to move with the frame, the sensing plate producing a horizontal position signal when in contact with the carcass; and
the control system is adapted to operate the frame driver and drive the frame horizontally, responsive to the presence of the horizontal position signal, until the sensing plate no longer contacts the carcass, to position the cutting plane to the desired horizontal location relative to the carcass.

6. An automatic hoof shearing device according to claim 5 wherein the shearing region is substantially unobstructed in a direction parallel to the carcass rail to form a pass-through shearing region.

7. An automatic hoof shearing device according to claim 6 wherein the shearing assembly comprises a pair of opposed support plates mounted perpendicular to the shearing plane, each support plate having a cutout defining an open end of the shearing region.

8. An automatic hoof shearing device according to claim 7 wherein the shearing assembly includes a fixed shearing blade, mounted between the support plates, and an opposed shearing blade slidably mounted between the support plates above the fixed blade.

9. An automatic hoof shearing device according to claim 8 wherein the cutting edge of the slidable shearing blade passes a shearing blade clearance distance away from the cutting edge of the fixed blade when the shearing blades move into the closed position, and the fixed blade is rotatably and lockably mounted between the support plates for adjustment of the shearing blade clearance distance.

10. An automatic hoof shearing device according to claim 9 wherein the fixed shearing blade comprises a fixed blade support member and a first pair of replaceable blade inserts and the slidable shearing blade comprises a sliding blade support member and a second pair of replaceable blade inserts.

11. An automatic hoof shearing device according to claim 10 further comprising:
a blade cover movable between an open and a closed position, the blade cover preventing the removal of the slidable blade inserts when closed; and
means for disabling the shearing blade driver when the blade cover is open.

12. An automatic hoof shearing device comprising:
a base adapted for mounting near a carcass rail;
a frame mounted on the base;
a shearing assembly mounted on the frame, the shearing assembly including at least one shearing blade movable in a shearing plane between an open and a closed shearing position, the shearing assembly defining a shearing region and the shearing plane being parallel to the carcass rail and tilted at an angle of greater than zero and less than ninety degrees relative to the horizontal;
a carcass position sensor producing a signal indicating the presence of a carcass with a hoof in the shearing region; and
a shearing blade driver responsively connected to the carcass position sensor for moving the shearing assembly from the open to the closed position to shear the hoof from the carcass.

13. An automatic hoof shearing device according to claim 12 wherein the shearing plane is tilted at an angle of about sixty degrees relative to the horizontal.

14. An automatic hoof shearing device comprising:
a base adapted for mounting near a carcass rail;
a frame mounted on the base;
a shearing assembly mounted on the frame, the shearing assembly including at least one shearing blade movable in a shearing plane between an open and a closed shearing position, the shearing assembly defining a shearing region with a width sufficient to receive two hooves for simultaneous shearing;
a carcass position sensor producing a signal indicating the presence of a carcass with a hoof in the shearing region; and
a shearing blade driver responsively connected to the carcass position sensor for moving the shearing assembly from the open to the closed position to shear the hoof from the carcass.

15. An automatic hoof shearing device according to claim 14 further comprising a guide means for guiding two hooves into position to be sheared as the shearing blade is moved to the closed position.

16. An automatic hoof shearing device according to claim 15 further comprising:
a blade cover movable between an open and a closed position, the blade cover preventing the removal of the shearing blade when closed; and
means for disabling the shearing blade driver when the blade cover is open.

17. An automatic hoof shearing device comprising:
a base adapted for mounting near a carcass rail;
a frame mounted on the base;
a shearing assembly mounted on the frame, the shearing assembly including at least one shearing blade movable in a shearing plane between an open and a closed shearing position, the shearing assembly defining a shearing region between a pair of opposed support plates mounted perpendicular to the shearing plane, each support plate having a cutout defining an open end of the shearing region to form a pass-through shearing region that is substantially unobstructed in a direction parallel to the carcass rail;
a carcass position sensor producing a signal indicating the presence of a carcass with a hoof in the shearing region; and a shearing blade driver responsively connected to the carcass position sensor for moving the shearing assembly from the open to the closed position to shear the hoof from the carcass.

18. An automatic hoof shearing device according to claim 17 wherein the shearing assembly includes a fixed shearing blade, mounted between the support plates, and an opposed shearing blade slidably mounted between the support plates above the fixed blade.

19. An automatic hoof shearing device according to claim 18 wherein the cutting edge of the slidable shearing blade passes a shearing blade clearance distance away from the cutting edge of the fixed blade when the shearing blades move into the closed position, and the fixed blade is rotatably and lockably mounted between the support plates for adjustment of the shearing blade clearance distance.

20. An automatic hoof shearing device according to claim 19 wherein the fixed shearing blade comprises a fixed blade support member and a first pair of replaceable blade inserts and the slidable shearing blade comprises a sliding blade support member and a second pair of replaceable blade inserts.

21. An automatic hoof shearing device according to claim 20 further comprising:
a blade cover movable between an open and a closed position, the blade cover preventing the removal of the slidable blade inserts when closed; and
means for disabling the shearing blade driver when the blade cover is open.

22. An automatic hoof shearing device comprising:
a base having a set of slide rails, the base being adapted for mounting near a carcass rail;
a frame slidably mounted on the base slide rails, the frame including a second set of slide rails oriented perpendicular to the base slide rails;
a shearing assembly including a pair of opposed support plates slidably mounted on the frame slide rails and a pair of opposed shearing blades, at least one of the shearing blades being mounted to slide in a shearing plane perpendicular to the support plates between an open and a closed shearing position, the shearing assembly defining a pass-through shearing region unobstructed by the support plates;
a frame driver connected between the frame and the base for sliding the frame along the base slide rails;
a shearing assembly driver connected between the shearing assembly and the frame for sliding the shearing assembly along the frame slide rails;
a hoof position sensing assembly producing signals indicating the vertical and horizontal position of a hoof on a carcass approaching the shearing region, the frame driver and shearing assembly driver being responsively connected to the hoof position sensing assembly to slide the frame and shearing assembly along the slide rails to position the cutting plane to a desired location relative to the hoof on the approaching carcass;
a carcass position sensor producing a signal indicating the arrival of a carcass with a hoof in the shearing region;
a shearing blade driver responsively connected to the carcass position sensor for moving the shearing blades from the open to the closed position to shear the hoof from the carcass.

23. An automatic hoof shearing device according to claim 22 further comprising a means for disabling the shearing assembly driver and the frame driver after the shearing plane has been positioned relative to a first hoof on the carcass.

* * * * *